United States Patent
Van Ballegoy et al.

(10) Patent No.: US 6,576,120 B1
(45) Date of Patent: Jun. 10, 2003

(54) CATALYTIC DEWAXING PROCESS

(75) Inventors: Carolus Maria Van Ballegoy, Amsterdam (NL); Edward Julius Creyghton, Amsterdam (NL); Jean-Paul Darnanville, Grand Couronne (FR); Eric Duprey, Grand Couronne (FR); Laurent Georges Huve, Amsterdam (NL); Carolus Matthias Anna Maria Mesters, Amsterdam (NL); Thomas Joris Remans, Amsterdam (NL); Maria Barbara Hendrica Crijnen-Van Beers, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/856,038

(22) PCT Filed: Nov. 12, 1999

(86) PCT No.: PCT/EP99/09024

§ 371 (c)(1),
(2), (4) Date: May 16, 2001

(87) PCT Pub. No.: WO00/29511

PCT Pub. Date: May 25, 2000

(30) Foreign Application Priority Data

Nov. 16, 1998 (EP) .............................................. 98402839
Sep. 27, 1999 (EP) .............................................. 99402401

(51) Int. Cl.[7] .............................................. C10G 11/05
(52) U.S. Cl. ........................ 208/119; 208/171; 208/27; 208/111.1; 208/110; 208/112; 208/109; 208/108; 502/60
(58) Field of Search ................................. 208/119, 171, 208/27, 111.1, 110, 112, 109, 108; 502/60

(56) References Cited

U.S. PATENT DOCUMENTS

| 3,629,096 | A | | 12/1971 | Divijak, Jr. |
| 4,458,024 | A | | 7/1984 | Oleck et al. |
| 4,510,044 | A | | 4/1985 | Oleck et al. |
| 4,568,655 | A | | 2/1986 | Oleck et al. |
| 5,804,058 | A | * | 9/1998 | Grandvallet et al. ........ 208/108 |

FOREIGN PATENT DOCUMENTS

| EP | 0 180 354 | 5/1986 | ............ C10G/45/64 |
| EP | 0 187 308 | 7/1986 | ............ C10G/45/64 |
| EP | 0 773 277 | 5/1997 | ............ C10G/45/64 |
| EP | 0 854 125 | 7/1998 | ............. C07C/5/27 |
| WO | 96 26997 | 9/1996 | ........ C10M/173/00 |

* cited by examiner

*Primary Examiner*—Walter D. Griffin
*Assistant Examiner*—James Arnold, Jr.

(57) ABSTRACT

The invention relates to a process for the catalytic dewaxing of a hydrocarbon feed containing waxy molecules by contacting the hydrocarbon feed under catalytic dewaxing conditions with a catalyst composition having metallosilicate crystallites, a binder and a hydrogenation component, wherein the weight ratio of the metallosilicate crystallites and the binder is between 5:95 and 35:65. The invention also relates to a catalyst composition having at least a low acidity refractory oxide binder, which binder is essentially free of aluminum, metallosilicate crystallites and a hydrogenation component, wherein the weight ratio of the metallosilicate crystallites and the binder is between 5:95 and 35:65.

22 Claims, No Drawings

CATALYTIC DEWAXING PROCESS

FIELD OF THE INVENTION

The invention relates to a process for the catalytic dewaxing of a hydrocarbon feed comprising waxy molecules by contacting the hydrocarbon feed under catalytic dewaxing conditions with a catalyst composition comprising metallosilicate crystallites, a binder and a hydrogenation component. With the term comprising used in this specification is meant comprising at least meaning that also other components may be present in, for example the catalyst composition or hydrocarbon feed.

BACKGROUND OF THE INVENTION

Such a process is described in EP-A-185448. This patent publication discloses a process for the manufacture of lubricating oils in which a hydrocarbon feedstock is subjected to catalytic dewaxing in the presence of a catalyst composition consisting of ZSM-22, an alumina binder and platinum. The catalyst was prepared by impregnating an extrudate consisting of 65 wt % ZSM-22 and 35 wt % alumina resulting in a catalyst containing 0.57 wt % of platinum.

There is a continuous effort in the field of catalytic dewaxing of improving the yield and the viscosity index (VI) of the lubricating obtained by said process. Furthermore efforts are made to provide a catalytic dewaxing process which can compete with solvent dewaxing processes in respect of for example oil yield and viscosity index at the same pour point specification. Solvent dewaxing is a difficult to operate semi-continuous process. Being able to replace a solvent extraction process by a catalytic dewaxing process is therefore desirable.

SUMMARY OF THE INVENTION

The object of the invention has been achieved when the weight ratio of the metallosilicate crystallites and the binder is between 5:95 and 35:65.

It has been found that with the present process a high yield of base oil product can be obtained at the same weight hourly space velocity. This implies that with a lower amount of metallosilicate crystallites more dewaxing selectivity is achieved. Furthermore it results in that the catalyst employed in the process according to the invention is cheaper than the prior art catalysts because less of the relatively more expensive metallosilicate crystallites is used in the catalyst composition. An additional advantage is that the gas make is lower with the present process.

WO-A-9617902 describes a catalyst composition for the catalytic dewaxing comprising of a aluminosilicate zeolite material and a binder in amounts from 80:20 to 20:80 by weight and typically from 80:20 to 50:50 zeolite:binder.

EP-A-304251 describes a catalytic dewaxing process in which preferably a catalyst composition is used without a binder. The catalyst used in the experiments is a nickel on ZSM-5 catalyst without a binder.

DETAILED DESCRIPTION OF THE INVENTION

By catalytic dewaxing is here meant a process for decreasing the pour point of lubricating base oil products by selectively converting the components of the oil feed which impart a high pour point to products which do not impart a high pour point. Products which impart a high pour point are compounds having a high melting point. These compounds are referred to as waxes. Wax compounds include for example high temperature melting normal paraffins, iso-paraffins and mono-ringed compounds. The pour point is preferably reduced by at least 10° C. and more preferably by at least 20° C. The hydrocarbon oils to be used as feed in the process according to the present invention will thus contain waxy molecules which impart an undesirable high pour point. Small amounts of these compounds can strongly influence the pour point. The feed will suitably contain between about 1% and up to 100% of these waxy compounds.

Suitable hydrocarbon oil feeds to be employed in the process according to the present invention are mixtures of high-boiling hydrocarbons, such as, for instance, heavy oil fractions. It has been found particularly suitable to use vacuum distillate fractions derived from an atmospheric residue, i.e. distillate fractions obtained by vacuum distillation of a residual fraction which in return is obtained by atmospheric distillation of a crude oil, as the feed. The boiling range of such a vacuum distillate fraction is usually between 300 and 620° C., suitably between 350 and 580° C. However, deasphalted residual oil fractions, including both deasphalted atmospheric residues and deasphalted vacuum residues, may also be applied. If the vacuum distillate fractions contain substantial amounts of sulphur- and nitrogen-containing contaminants, for example, having sulphur levels up to 3% by weight and nitrogen levels up to 1% by weight, it may be advantageous to treat this feedstock to a hydrodesulphurisation and hydrodenitrogenation step prior to the catalytic dewaxing process according to the present invention.

Examples of feeds having relatively high amounts of waxy compounds are synthetic waxy raffinates (Fischer-Tropsch waxy raffinates), hydrocracker bottom fractions (hydrowax), i.e. those fractions having an effective cutpoint of at least 320° C., preferably at least 360° C. and slack waxes obtained from the dewaxing of hydro-processed or solvent refined waxy distillates. These feeds have a wax content of at least 50% by weight, preferably at least 80% by weight and more preferably at least 90% by weight. These feeds are used to prepare lubricating base oils having viscosity indices (VI) above 120 and particularly above 135.

Prior to the catalytic dewaxing process according to the invention the vacuum distillate fraction or any other sulphur or nitrogen containing feedstock is preferably treated to a hydrotreating step in order to reduce the concentration of sulphur and/or nitrogen in the feed. The hydrotreating step preferably involves contacting the feed with hydrogen in the presence of a suitable catalyst. Such catalysts are known in the art and in principle any hydrotreating catalyst known to be active in the hydrodesulphurisation and hydrodenitrogenation of the relevant hydrocarbon feeds may be used. Suitable catalysts, then, include those catalysts comprising as the non-noble Group VIII metal component one or more of nickel (Ni) and cobalt (Co) in an amount of from 1 to 25 percent by weight (%wt), preferably 2 to 15% wt, calculated as element relative to total weight of catalyst and as the Group VIB metal component one or more of molybdenum (Mo) and tungsten (W) in an amount of from 5 to 30% wt, preferably 10 to 25% wt, calculated as element relative to total weight of catalyst. These metal components may be present in elemental, oxidic and/or sulphidic form and are supported on a refractory oxide carrier. The refractory oxide support of the first stage catalyst may be any inorganic oxide, alumino-silicate or combination of these, optionally in combination with an inert binder material. Examples of suitable refractory oxides include inorganic oxides, such as alumina, silica, titania, zirconia, boria, silica-alumina, fluorided alumina, fluorided silica-alumina and mixtures of two or more of these. In a preferred embodiment an acidic carrier such as alumina, silica-alumina or fluorided alumina is used as the refractory oxide carrier. The refractory oxide support may also be an aluminosilicate. Both synthetic and naturally occurring aluminosilicates may be used. Examples are natural or dealuminated zeolite beta, faujasite and zeolite Y. From a selectivity point of view it is preferred to use the dealuminated form of these zeolites. A preferred aluminosilicate to be applied is alumina-bound, at least partially dealuminated, zeolite Y.

Catalytic dewaxing conditions are known in the art and typically involve operating temperatures in the range of from 200 to 500° C., suitably from 250 to 400° C., hydrogen pressures in the range of from 10 to 200 bar, suitably from 15 to 100 bar, more suitably from 15 to 65 bar, weight hourly space velocities (WHSV) in the range of from 0.1 to 10 kg of oil per liter of catalyst per hour (kg/l/hr), suitably from 0.2 to 5 kg/l/hr, more suitably from 0.5 to 3 kg/l/hr and hydrogen to oil ratios in the range of from 100 to 2,000 liters of hydrogen per liter of oil.

The weight ratio of the metallosilicate crystallites and the binder is between 5:95 and 35:65. Preferably the weight ratio is 10:90 and above. The upper ratio is preferably lower than 30:70. It has been found that a lower ratio is beneficial for achieving the advantages of the present invention. However when lowering this ratio a higher operating temperature is required to achieve a comparable pour point reduction. Therefore a ratio of 5:95 is the practical lower range of the metallosilicate crystallites to binder weight ratio, because at lower ratios the required operating temperatures will be too high for practical applications.

The binder can be a synthetic or naturally occurring (inorganic) substance, for example clay, silica and/or metal oxides. Natural occurring clays are for example of the montmorillonite and kaolin families. The binder is preferably a porous binder material, for example a refractory oxide of which examples are: alumina, silica-alumina, silica-magnesia, silica-zirconia, silica-thoria, silica-beryllia, silica-titania as well as ternary compositions for example silica-alumina-thoria, silica-alumina-zirconia, silica-alumina-magnesia and silica-magnesia-zirconia. More preferably a low acidity refractory oxide binder material which is essentially free of alumina is used. Examples of these binder materials are as silica, zirconia, titanium dioxide, germanium dioxide, boria and mixtures of two or more of these of which examples are listed above. The most preferred binder is silica.

The hydrogenation component suitably comprises at least one Group VIB metal component and/or at least one Group VIII metal component. Group VIB metal components include tungsten, molybdenum and/or chromium as sulphide, oxide and/or in elemental form. If present, a Group VIB metal component is suitably present in an amount of from 1 to 35% by weight, more suitably from 5 to 30% by weight, calculated as element and based on total weight of support, i.e. modified molecular sieve plus binder.

More preferably only a Group VIII metal component is present as the catalytically active hydrogenation component. Group VIII metal components include those components based on both noble and non-noble metals. Particularly suitable Group VIII metal components, accordingly, are palladium, platinum, nickel and/or cobalt in sulphidic, oxidic and/or elemental form. The total amount Group VIII metal will suitably not exceed 10% by weight calculated as element and based on total weight of support, and preferably is in the range of from 0.1 to 5.0% by weight, more preferably from 0.2 to 3.0% by weight. If both platinum and palladium are present, the weight ratio of platinum to palladium may vary within wide limits, but suitably is in the range of from 0.05 to 10, more suitably 0.1 to 5. Catalysts comprising palladium and/or platinum as the hydrogenation component are preferred.

The metallosilicate crystallites have a crystalline microporous structure and can generally be defined as being built up of three-dimensional frameworks of tetrahedral $SiO_4$ units and tetrahedral M units or tetrahedral $SiO_4$ units and octahedral M units which units are corner linked via oxygen atoms. Examples of possible metals for M are Al, Fe, B, Ga or Ti or combinations of these metals. Preferred metallosilicate crystallites are aluminosilicate zeolite crystallites suitably having pores with a diameter in the range of from 0.35 to 0.80 nm. Preferred aluminosilicate zeolite crystallites include MFI-type zeolites having pores with diameters of 0.55 and 0.56 nm, such as ZSM-5 and silicalite, offretite having pores with diameters of approximately 0.68 nm and zeolites of the ferrierite group having pores with diameter of 0.54 nm, such as ZSM-35 and ferrierite. Another preferred class of aluminosilicate zeolite crystallites include TON-type zeolites. Examples of TON-type aluminosilicate zeolite crystallites are ZSM-22, Theta-1 and Nu-10 as described in U.S. Pat. No. 5,336,478, EP-A-57049 and EP-A-65400. A further preferred class of aluminosilicate. zeolite crystallites are of the MTW-type. Examples of molecular sieve crystallites having the MTW-type topology are ZSM-12, Nu-13, TEA-silicate, TPZ-3, TPZ-12, VS-12 and Theta-3 as for example described in U.S. Pat. No. 3,832,449, EP-A-513118, EP-A-59059 and EP-A-162719. A next preferred class of aluminosilicate zeolite crystallites are of the MTT-type. Examples of alumino-silicate zeolite crystallites having the MTT-type topology are ZSM-23, SSZ-32, ISI-4, KZ-1, EU-1, EU-4 and EU-13 as for example described U.S. Pat. No. 4,076,842, U.S. Pat. No. 4,619,820, EP-A-522196, EP-A-108486 and EP-A-42226.

More preferably the zeolite crystallites have a Constraint Index of between 2 and 12. The Constraint Index is a measure of the extent to which a zeolite provides control to molecules of varying sizes to its internal structure of the zeolite. Zeolites which provide a highly restricted access to and egress from its internal structure have a high value for the Constraint Index. On the other hand, zeolites which provide relatively free access to the internal zeolite structure have a low value for the Constraint Index, and usually pores of large size. The method by which Constraint Index is determined is described fully in U.S. Pat. No. 4,016,218, incorporated herein by reference for details of the method.

Constraint Index (CI) values for some typical materials are:

|  | CI (At Test Temperature) | |
|---|---|---|
| ZSM-4 | 0.5 | (316° C.) |
| ZSM-5 | 6–8.3 | (371–316° C.) |
| ZSM-11 | 6–8.7 | (371–316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-38 | 2 | (510° C.) |

-continued

| | CI (At Test Temperature) | |
|---|---|---|
| ZSM-48 | 3.5 | (538° C.) |
| ZSM-50 | 2.1 | (427° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-Alumina | 0.6 | (538° C.) |
| Dealuminized Y (Deal Y) | 0.5 | (510° C.) |
| Erionite | 38 | (316° C.) |
| Zeolite Beta | 0.6–2 | (316–399° C.) |

The very nature of the Constraint Index and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g., temperature, as to establish more than one value for the Constraint Index of a particular zeolite. This explains the range of Constraint Indices for zeolites, such as ZSM-5, ZSM-11 and Zeolite Beta in the above Table.

When using the above described classes of aluminosilicate zeolite crystallites, especially the zeolites of the MFI and MTW type, it has been found to be advantageous to subject the catalyst to a dealumination treatment. Advantages of this treatment are a further increase of the yield of lubricating base oil, an improved stability of the catalyst and/or an improved crush strenght of the final catalyst. Dealumination results in a reduction of the number of alumina moieties present in the zeolite and hence in a reduction of the mole percentage of alumina.

Dealumination treatment is preferably performed in that the surface of the zeolite crystallites is selectively dealuminated. Surface dealumination results in a reduction of the number of surface acid sites of the zeolite crystallites, whilst not affecting the internal structure of the zeolite crystallites. The extent of dealumination of the surface of the crystallites depends on the severity of the dealumination treatment. Suitably, the number of surface acid sites of the zeolite is reduced with at least 70%, preferably with at least 80% and even more preferably with at least 90%. In a most preferred embodiment the number of surface acid sites is reduced with essentially 100% by the selective dealumination, thus leaving essentially no surface acid sites at all.

Dealumination can be attained by methods known in the art. Particularly useful methods are those, wherein the dealumination selectively occurs, or anyhow is claimed to occur selectively, at the surface of the crystallites of the molecular sieve. Examples of dealumination processes are described in WO-A-9641849. Preferably dealumination is performed by a process in which the zeolite is contacted with an aqueous solution of a fluorosilicate salt wherein the fluorosilicate salt is represented by the formula:

$(A)_{2/b}SiF_6$ wherein 'A' is a metallic or non-metallic cation other than H+ having the valence 'b'. Examples of cations 'b' are alkylammonium, $NH_4^+$, $Mg^{++}$, $Li^+$, $Na^+$, $K^+$, $Ba^{++}$, $Cd^{++}$, $Cu^+$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$, and $Zn^{++}$. Preferably 'A' is the ammonium cation. The zeolite material may be contacted with the fluorosilicate salt in an amount of at least 0.0075 moles per 100 grams of the zeolite material. The pH is suitably between 3 and 7. An example of the above described dealumination process also referred to as the AHS treatment, is described in U.S. Pat. No. 5,157,191.

When zeolite crystallites are used which have been subjected to a dealumination treatment the binder material is preferably a material which does not introduce acidity into the modified zeolite crystallite. Such a binder material is preferably the above described low acidity refractory oxide, which is essentially free of aluminium. It has been found that an increased mechanical strenght of the catalyst extrudate is obtained when prepared according to this sequence of steps.

The crystallite size of the zeolite may be as high as 100 micron. Preferably small crystallites are used in order to achieve an optimum catalytic activity.

Preferably crystallites smaller than 10 micron and more preferably smaller than 1 micron are used. The practical lower limit is suitably 0.1 micron. It has been found that the combination of small size crystallites and a surface dealumination treatment, especially the AHS treatment, as described above results in more active catalyst when compared to the same, but non-dealuminated, catalyst. Preferable catalysts are used having a crystallite size of between 0.05 and 0.2 m and which have been subjected to a dealumination treatment. The invention is also directed to the novel catalyst compositions having such small size surface dealuminated zeolite crystallites and low acidity binder materials and their use in hydrocarbon conversion processes, optionally also comprising a Group VIII or Group VIB metal of which examples are mentioned above. Suitable processes are catalytic dewaxing, hydroisomerisation and hydrocracking.

A disadvantage of a catalyst composition having a low content of metallosilicate crystallites is that the crush strength is not always high enough to suit practical application. To overcome this problem applicants have now found a preferred method of preparing such catalysts having an improved crush strength as will be described below. The method is especially suitable when using a low acidity refractory binder. This method comprises the steps of:
(a) preparing an extrudable mass comprising a substantially homogenous mixture of metallosilicate crystallites, water, a source of the low acidity refractory oxide binder present as a mixture of a powder and a sol,
(b) extruding the extrudable mass resulting from step (a),
(c) drying the extrudate resulting from step (b) and,
(d) calcining the dried extrudate resulting from step (c).

Catalyst particles obtained by the above process have an increased crushing strength. This is advantageous because such catalysts are typically applied in a packed bed reactor. Due to the normally high operating pressure and mass flows in the reactor strong catalyst particles are needed.

The description of the above method will further refer to a silica binder only. It will be understood that the below preferred conditions will, when applicable, also apply to other possible binders as here described.

Preferably the silica sol is an acid silica sol. The acid silica sol may be any colloidal silica having a pH lower than 7. When a pH value is mentioned the pH as measured in water of 18° C. is meant. An example of a suitable acid silica sol is Nyacol 2034DI (trademark of PQ Corp, Valley Forge, Pa.) or Ultra-Sol 7H (trademark of RESI Inc, Newark). The silica powder may be commercially obtained silica powder, for example Sipernat 22 or 50 (trademark of Degussa AG), Nasilco Ultrasil VN3SP or HiSil 233 EP (trademark of PPG Industries). The solid silica powder particles preferably have a mean diameter of between 10 μm and 200 μm.

The surface of the acid silica sol particle comprises —OH groups. It is believed that for obtaining a catalyst particle having an even higher strength it is essential that during the mixing of the components in step (a) some or all of these groups are converted to —O— groups. This is preferably achieved by adding an amine compound in step (a). It has further been found that when adding an amine compound just before performing step (b) an even more stronger catalyst particle is obtained. It is believed, although we do not wish to be bound to this theory, that the stronger catalyst is obtained because not all of the —OH groups on the sol particle surface are converted into —O— groups. Thus step (a) is preferably performed by first mixing the zeolite and the acid silica sol into a first homogeneous mixture and subsequently adding the amine compound to the first homogeneous mixture such that the pH of the resulting second mixture is raised from below 7 to a value of above 8. It can be easily determined by one skilled in the art, by straightforward experimentation, what the optimal moment in step (a) is for adding the amine compound. As a guideline it is preferred to add the amine compound during the second half of the time and more preferably in the last quarter of the time required to mix the components in step (a). Most preferably the amine compound is added within 20 minutes before performing step (b).

The extrudable mass in step (a) should have a sufficient viscosity in order to be extruded into shapes. One skilled in the art will know how to achieve such a paste like mixture. For example by adding water in step (a) the viscosity can be lowered. The water content of the sol may be between 60 and 80 wt %. Preferably the water content of the extrudable mass as obtained in step (a) does not exceed 60%, and preferably is at least 35% by weight.

To obtain an even stronger catalysts it is preferred to maximise the amount of acid silica sol used relative the amount of silica powder used, while still achieving a sufficient viscosity of the extrudable mass. The optimal amount of silica powder to be used will depend on the zeolite content, wherein at a low zeolite content of the catalyst, more silica powder will have to be used. One skilled in the art can easily determine the optimal composition in view of the above teaching.

The amine compound is preferably a compound according to the general formula $R^1R^2R^3N$ in which $R^1$–$R^3$ may be hydrogen and/or an alkyl group having 1–6 carbon atoms. Examples are ammonia, methyl ethyl amine, triethyl amine, of which ammonia, is the most preferred. The amine compound should preferably be added in such an amount in order to raise the pH of the mass to alkaline conditions. Preferred conditions are a pH of the mixture obtained in step (a) of above 8. The pH will be lower than 14.

Step (a) may for example be performed at ambient conditions by first mixing the zeolite, optionally the silica powder and acid silica sol, subsequently adding an amine compound and optionally at the end of step (a) a plasticising agent. The plasticiser agent is used to increase the viscosity of the mixture in order to obtain an extrudable mass. Suitable plasticising agents are for example dextrose, gelatine, glucose, glues, gums, salts, waxes, starch and cellulose ethers. Some typical cellulose ether binders are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M (Trademarks of Dow Chemical Co).

The extrusion in step (b) may be performed by well known processes as for example illustrated in Perry's Chemical Engineers' Handbook, McGRAW-HILL International Editions, sixth edition, 1984, p 8-60 to 8-66 and in Particle Size Enlargement, Handbook of powder Technology Vol. 1, Elsevier, 1980, p 112–121. Examples of such methods are extrusion performed by a screw extruder, a plate or ram extruder. The extrudates can have a wide variety of forms and sizes.

Drying step (c) and calcining step (d) may be performed under conditions well known to one skilled in the art. Step (c), for example, may take place at a temperature of at least 60° C. to about 250° C., for a time sufficient to dry the extrudate, for example, for at least 1 hour. Calcining step (d), for example, may take place in air, or other inert gas, at temperatures ranging from 250° C. to 850° C. for periods of time ranging, for example, from about 1 to about 48 hours or more.

The invention is also related to a catalyst composition having the improved crushing strength as obtainable by the method as described above and its use in hydroconversion processes.

The product obtained in the catalytic dewaxing process according to the invention may optionally be subjected to a hydrofinishing step. Hydrofinishing is known in the art and examples of suitable hydrofinishing steps are disclosed in, for instance, U.S. Pat. No. 5,139,647, WO-A-9201657 and WO-A-9201769. Generally, hydrofinishing comprises contacting a hydrocarbon feed, in this case a feed comprising the dewaxed lubricating base oil, with a hydrogenation catalyst under relatively mild conditions in order to saturate at least part of the aromatics still present in the dewaxed base oil. Suitable catalysts are those normally applied for this purpose with noble metal-based catalysts, such as those comprising Pt and/or Pd supported on an amorphous silica-alumina carrier or comprising Pt on an alumina support, being preferred options. Hydrofinishing conditions normally involve operating temperatures up to 350° C. and preferably between 150 and 300° C., operating pressures from 10 to 200 bar and weight hourly space velocities of from 0.5 to 7.5 kg/l/h.

The effluent from the catalytic dewaxing process or optionally the effluent of a hydrofinishing treatment applied subsequently is separated into a gaseous fraction and a liquid fraction. Such separation or fractionation can be attained by conventional methods, such as by distillation under atmospheric or reduced pressure. Of these, distillation under reduced pressure, including vacuum flashing and vacuum distillation, is most suitably applied. The cutpoint(s) of the distillate fraction(s) is/are selected such that each product distillate recovered has the desired properties for its envisaged application. For lubricating base oils, the cutpoint will normally be at least 280° C. and will normally not exceed 400° C., the exact cutpoint being determined by the desired product properties, such as volatility, viscosity, viscosity index and pour point.

The invention will now be illustrated with the following non-limiting examples.

EXAMPLE 1

A dealuminated, silica bound ZSM-5 catalyst (10% wt dealuminated ZSM-5, 90% wt silica binder) was prepared according to the following procedure. ZSM-5 (having a $SiO_2/Al_2O_3$ molar ratio of 50) was extruded with a silica binder (10% by weight of ZSM-5, 90% by weight of silica binder). The extrudates were dried at 120° C. A solution of $(NH_4)_2SiF_6$ (45 ml of 0.077 N solution per gram of ZSM-5 crystallites) was poured onto the extrudates. The mixture was then heated at 100° C. under reflux for 17 h with gentle stirring above the extrudates. After filtration, the extrudates were washed twice with deionised water, dried for 2 hours at 120° C. and then calcined for 2 hours at 480° C. The dealuminated ZSM-5 thus obtained had a $SiO_2/Al_2O_3$ molar ratio 26.0.

The thus obtained extrudate was impregnated with an aqueous solution of platinum tetramine hydroxide followed by drying (2 hours at 120° C.) and calcining (2 hours at 300° C.). The catalyst was activated by reduction of the platinum under a hydrogen rate of 100 1/hr at a temperature of 350° C. for 2 hours. The resulting catalyst comprised 0.7% by weight Pt supported on the dealuminated, silica-bound ZSM-5.

A hydrocracked waxy raffinate having the properties as listed in Table I was contacted in the presence of hydrogen with the dealuminated, silica-bound ZSM-5 catalyst at a temperature of 310° C., an outlet pressure of 40 bar, a WHSV of 1.0 kg/l.hr and a hydrogen gas rate of 700 Nl/kg. Gaseous components were separated from the effluent by vacuum flashing at a cutting temperature of 300° C. The properties of the obtained lubricating base oil product and the yield of the catalytic dewaxing experiment are given in Table II.

TABLE I

Properties of hydrocracked waxy raffinate

| | | Boiling point distribution (% wt) | |
|---|---|---|---|
| Density 70/4 | 0.817 | | |
| Vk40 (cSt) | 21.8 | IBP–380° C. | 10 |
| Vk100 (cSt) | 4.51 | 380–420° C. | 40 |
| VI | 121 | 420–470° C. | 40 |
| Sulphur (ppmw) | 2.9 | 470–FBP ° C. | 10 |
| Nitrogen (ppmw) | <1 | | |
| Pour point (° C.) | +27 | IBP (° C.) | 334 |
| Wax content (% wt) | 16.7 | FBP (° C.) | 538 |

Vk40 is kinematic vicosity measured at 40° C.; Vk100 is the kinematic viscosity at 100° C.

EXAMPLE 2

Example 1 was repeated except that the content of ZSM-5 was 30 wt %. The properties of the obtained lubricating base oil product and the yield of the catalytic dewaxing experiment are given in Table II.

EXAMPLE 2a

Example 1 was repeated except that a catalyst was used consisted of 90 wt % silica binder, 10 wt % ZSM-12 powder and a platinum loading of 0.7 wt %. The crystal size of the ZSM-12 crystallites was 1 $\mu$m and the extrudate was dealuminated as in Example 1. The properties of the obtained lubricating base oil product and the yield of the catalytic dewaxing experiment are given in Table II.

EXAMPLE 2b

Example 2a was repeated except that the crystal size was between 0.1 and 0.2 $\mu$m. See Table II for more results.

EXAMPLE 2c

Example 2b was repeated except that no dealumination treatment was used to prepare the catalyst. See Table II for more results.

Comparative Experiment A

Example 1 was repeated except that the amount of ZSM-5 crystallites in the catalyst was increased to 60 wt %. The resulting catalyst comprised 0.7% by weight Pt supported on the dealuminated, silica-bound ZSM-5 catalyst. The properties of the obtained lubricating base oil product and the yield of the catalytic dewaxing experiment are given in Table II.

TABLE II

| | Product characteristics | | | | | |
|---|---|---|---|---|---|---|
| | Example 1 | Example 2 | Example 2a | Example 2b | Example 2c | Comp. Exper. A |
| catalyst | ZSM-5 | ZSM-5 | ZSM-12 size = 1–2 $\mu$m | ZSM-12 size = 0.1– 0.2 $\mu$m | ZSM-12 size = 0.1– 0.2 $\mu$m no AHS | ZSM-5 |
| reaction temperature | 310° C. | 309° C. | 358° C. | 312° C. | 350° C. | 294° C. |
| Yield (% wt) | 80 | 78 | 91 | 91 | 82.4 | 75.6 |
| Gas make (% wt) | 4.3 | 5.5 | 2.9 | 3.6 | 3.6 | 7.6 |
| Pour point (° C.) | −16 | −16 | −16 | −16 | −16 | −16 |
| VI | 105 | 104 | 108 | 108 | 105 | 101 |

EXAMPLE 3

Example 1 was repeated except that 10 wt % of SSZ-32 was used instead of ZSM-5 and dealumination was performed as follows: 0.353 grams of ammonium hexafluorosilicate was dissolved in 1420 ml deionised water. Then, this solution passes over 45 grams of extrudates at ambient temperature for 17 hours. After separation from the solution, the extudates are washed with deionised water, dried for two hours at 150° C. and then calcined for two hours at 480° C. The loading of platinum was as in Example 1.

The properties of the obtained lubricating base oil product and the yield of the catalytic dewaxing experiment are given in Table III.

Comparative Experiment B

Comparative experiment A was repeated except that 70 wt % of SSZ-32 was used. Dealumination was performed as follows: 2.68 grams of ammonium hexafluorosilicate was dissolved in 1562 ml deionised water. Then, this solution passes over 49.5 grams of extrudates at ambient temperature for 17 hours. After separation from the solution, the extrudates are washed with deionised water, dried for two hours at 150° C. and then calcined for two hours at 480° C. The loading of platinum was as in Example 1.

The properties of the obtained lubricating base oil product and the yield of the catalytic dewaxing experiment are given in Table III.

TABLE III

|  | Example 3 | Comparative Experiment B |
| --- | --- | --- |
| operating temperature | 317° C. | 305° C. |
| Yield (% wt) | 85.7 | 79.2 |
| Vk40 (cst) | 24.57 | 27.34 |
| Vk100 (cSt) | 4.68 | 4.93 |
| Gas make (% wt) | 2.6 | 7.5 |
| Pour point (° C.) | −25 | −24 |
| VI | 108 | 104 |

EXAMPLE 4

Example 2 was repeated at 313° C. starting from a hydrocracked waxy raffinate having the properties as listed in Table IV. The properties of the obtained lubricating base oil product and the yield of the catalytic dewaxing experiment are given in Table V.

TABLE IV

Properties of hydrocracked waxy raffinate

|  |  | Boiling point distribution (% wt) |  |
| --- | --- | --- | --- |
| Density 70/4 | 0.8416 |  |  |
| Vk80 (cSt) | 14.60 | IBP–440° C. | 10 |
| Vk100 (cSt) | 8.709 | 440–469° C. | 30 |
| Vk120 (cSt) | 6.021 | 469–518° C. | 40 |
| Sulphur (ppmw) | 95 | 518–FBP ° C. | 20 |
| Nitrogen (ppmw) | 1.1 |  |  |
| Pour point (° C.) | +41 | IBP (° C.) | 366 |
| Wax content (% wt) | 30 | FBP (° C.) | 587 |

EXAMPLE 5

Example 4 was repeated wherein a catalyst was used containing 10 wt % of TON type zeolite and 90 wt % silica. No dealumination treatment was applied. The TON type zeolite crystallites were prepared as described below. The properties of the obtained lubricating base oil product and the yield of the catalytic dewaxing experiment are given in Table V.

Preparation of the TON type crystallites:

Two mixtures A and B were prepared. Solution A: A solution of 6.66 g $Al_2(SO_4)3.18H_2O$, 13.65 g KOH (85 wt. %), 4.11 g RbOH (50 wt. %), and 32.4 g 1,6-diamino-hexane in 325 g demineralised water was prepared in a polyethylene (PE). container. Solution B: 150 g Ludox AS-40 (Trademark of DuPont) and 240 g demineralised water were mixed in a PE container.

Solution B was added to solution A while stirring and 0.3 g of ZSM-22 seeds were added. After the addition of the seed crystals stirring was continued for 10 minutes. The resulting synthesis gel was placed in a 1 liter teflon-lined stirred autoclave. The molar composition of the thus prepared synthesis mixture was: 100 $SiO_2$: $Al_2O_3$: 27.87 R: 10.67 $K_2O$: 1.0 $Rb_2O$: 3680 $H_2O$ in which R=1,6-diaminohexane.

The autoclave was closed and the stirrer was adjusted to 600 rpm. The synthesis mixture was heated from room temperature to 156° C. within two hours. The synthesis mixture was kept at this temperature for 60 hours.

After synthesis, the zeolite crystals were isolated by filtration and washed with demineralised water. XRD analysis showed that the product was excellent crystalline TON without any other crystalline contaminant. The purity was very high; no ZSM-5 and/or cristoballite impurities were detected.

Comparative Experiment C

Example 5 was repeated except that now a catalyst was used which was prepared by starting with an extrudate containing 60 wt % TON type zeolite and 40 wt % silica binder. The properties of the obtained lubricating base oil product and the yield of the catalytic dewaxing experiment are given in Table V.

TABLE V

|  | Example 4 | Example 5 | Comparative experiment C |
| --- | --- | --- | --- |
| extrudate | 30 wt % ZSM-5 70 wt % silica | 10 wt % TON 90 wt % silica | 60 wt % TON 40 wt % silica |
| metal loading in final catalyst | 0.7 wt % Pt | 0.7 wt % Pt | 0.7 wt % Pt |
| operating temperature (° C.) | 313 | 340 | 316 |
| Oil yield (wt %) | 86 | 90 | 88 |
| gas make (% wt) | 5.7 | 3.7 | 5.8 |
| VI | 90 | 97 | 94 |
| Pour point (° C.) | −9 | −9 | −9 |

The following examples will illustrate the preparation of a catalyst having a low aluminosilicate zeolite content and a high crushing strength.

Comparative Experiment D

On a dry basis, 60 weight parts of ZSM-5 (CBV8014 as obtained from Zeolyst International) were intimately admixed with 15 weight parts of amorphous precipitated silica powder (Sipernat-50 as obtained from Degussa) and with 25 weight parts of acid colloidal silica (Nyacol 2034DI as obtained from PQ Corporation); a homogenous mix was obtained by mulling. The total moisture content of the mix was adjusted to 55 weight percent with deionized water.

5 minutes before extruding the mixture a plasticiser agent, Methocel source (containing 2.1 wt % methocel), was added to the extrudable mass in a ratio of 7/100 of Methocel source relative to the zeolite dry mass. The mixture was extruded to yield cylinder extrudates with a diameter of 1.6 mm. The extrudates were subsequently dried at 120° C. for typically 2 hours in air and then calcined at 800° C. for 5 hours.

The Flat Plate Crushing Strength was measured by determining the force in N/cm at which the cylinder extrudate was crushed between two parallel flat plates. The cylinder extrudate was positioned between the plates in such that the cylindrical axis was parallel with the plates. This procedure was repeated 40 times and the average force at which crushing was observed was the resulting Flat Plate Crushing Strength (FPCS). In this example a FPCS of 60 N/cm was measured. See also Table VI.

EXAMPLE 6

Comparative Experiment D was repeated except that the ZSM-5 content was 30 wt %, the silica powder content was 35 wt % and the acid silica sol content was 35 wt %. A FPCS of 86 N/cm was measured. As a result of the lower ZSM-5 content as compared to Comparative Experiment D one would expect a lower FPCS. The resulting higher FPCS is a result of the higher content of acid silica sol as compared to Comparative Experiment D. The FPCS is however not high enough for commercial application. A value of higher than 100 N/cm is desirable. See also Table VI.

EXAMPLE 7

Example 6 was repeated except instead of acid silica sol the same amount of basic colloidal silica of the type Ludox HS-30 was used. The Flat Plate Crushing Strength was 80 N/cm.

EXAMPLE 8

Example 6 was repeated except that, after mixing the ZSM-5, silica powder and acid colloidal silica, ammonia was added. Ammonia as a 2.5 wt % aqueous solution was added in a ratio of 1/12 ammonia solution relative to the zeolite dry mass. The resulting pH was 8.8. After adding the ammonia the mixing was continued for 35 minutes before extruding. The Flat Plate Crushing Strength was 122 N/cm. See also Table VI.

EXAMPLE 9

Example 8 was repeated except that ammonia was added after 35 minutes after mixing the ZSM-5, silica powder and acid colloidal silica. After adding the ammonia the mixing was continued for 10 minutes before extruding. The Flat Plate Crushing Strength was 178 N/cm.

TABLE VI

| Experiment | ZSM-5 content (wt %) | Silica powder (wt %) | Silica sol (wt %) | acidity of used silica sol | ammonia added | FPCS (N/cm) |
|---|---|---|---|---|---|---|
| Comp. D | 60 | 15 | 25 | acid | no | 60 |
| Example 6 | 30 | 35 | 35 | acid | no | 86 |
| Example 7 | 30 | 35 | 35 | basic | no | 80 |
| Example 8 | 30 | 35 | 35 | acid | 35 minutes before extrusion | 122 |
| Example 9 | 30 | 35 | 35 | acid | 10 minutes before extrusion | 178 |

EXAMPLE 10

The catalysts prepared in Example 9 was used in a catalytic dewaxing process as described in Example 1. The results in yield and selectivity were the same as in said Example except that the required temperature to achieve the same reduction in pour point was about 10° C. higher.

EXAMPLE 11

A wax containing feedstock obtained by a Fischer-Tropsch process followed by a mild hydroconversion having the properties as listed in Table VII was contacted with a catalyst consisting of 30 wt % dealuminated ZSM-5 70 wt % silica and 0.7 wt % platinum. The carrier was prepared according to Example 9 and the metal impregnation was performed according to Example 1. Contacting took place in the presence of hydrogen at a temperature of 296° C., an outlet pressure of 50 bar, a WHSV of 1.0 kg/l.hr and a hydrogen gas rate of 750 Nl/kg feed. Gaseous components were separated from the effluent by vacuum flashing at a cutting temperature of 390° C. The properties of the obtained lubricating base oil product and the yield of the catalytic dewaxing experiment are given in Table VIII.

TABLE VII

| | | Boiling range (° C.) | |
|---|---|---|---|
| Density 70/4 | 0.784 | | |
| Vk100 (cSt) | 6.244 | IBP | 290 |
| Pour point (° C.) | +40 | 50 vol % | 466 |
| | | FBP | 701 |

TABLE VIII

| | Example 11 |
|---|---|
| operating temperature | 296° C. |
| Yield (% wt) | 45 |
| Vk40 (cSt) | 58.62 |
| Vk100 (cSt) | 9.75 |
| Gas make (% wt) | 12 |
| Pour point (° C.) | −30 |
| VI | 151 |

EXAMPLE 12

A wax containing feedstock, being the heavy product of a hydrocracking process (hydrowax) which primary products are middle distillates, having the properties as listed in Table IX was contacted with a catalyst as used in Example 11 in the presence of hydrogen at a temperature of 330° C., an outlet pressure of 40 bar, a WHSV of 1 kg/l.hr and a hydrogen gas rate of 500 Nl/kg feed. Gaseous components were separated from the effluent by vacuum flashing at a cutting temperature of 390° C. The properties of the obtained lubricating base oil product and the yield of the catalytic dewaxing experiment are given in Table X.

TABLE IX

|  |  | Boiling range (° C.) | |
| --- | --- | --- | --- |
| Density 70/4 | 0.821 | | |
| Vk100 (cSt) | 4.166 | IBP | 202 |
| Pour point (° C.) | +36 | 50 vol % | 417 |
| | | FBP | 587 |

TABLE X

|  | Example 12 |
| --- | --- |
| operating temperature | 330 |
| Yield (% wt) | 48.1 |
| Vk40 (cSt) | 58.13 |
| Vk100 (cSt) | 7.70 |
| Gas make (% wt) | 1.1 |
| Pour point (° C.) | −12 |
| VI | 95 |

EXAMPLE 13

A feedstock having the properties of a finished base oil as listed in Table XI was contacted with a catalyst as used in Example 11 in the presence of hydrogen at a temperature of 340° C., an outlet pressure of 40 bar, a WHSV of 1 kg/l.hr and a hydrogen gas rate of 500 Nl/kg feed. The properties of the obtained lubricating base oil product and the yield of the catalytic dewaxing experiment are given in Table XII.

TABLE XI

|  |  | Boiling range (° C.) | |
| --- | --- | --- | --- |
| Density 15/4 | 0.826 | | |
| Vk100 (cSt) | 5.134 | IBP | 353 |
| Pour point (° C.) | −19 | 50 vol % | 451 |
| | | FBP | 617 |

TABLE XII

|  | Example 13 |
| --- | --- |
| operating temperature | 340 |
| Yield (% wt) | 74.3 |
| Vk40 (cSt) | 25.98 |
| Vk100 (cSt) | 5.214 |
| Gas make (% wt) | 17.1 |
| Pour point (° C.) | −36 |
| VI | 136 |

What is claimed is:

1. A process for the catalytic dewaxing of a hydrocarbon feed comprising waxy molecules said process comprising: contacting the hydrocarbon feed under catalytic dewaxing conditions with a catalyst composition comprising metallosilicate crystallites, a binder and a hydrogenation component, in which the weight ratio of the metallosilicate crystallities and the binder is between 5:95 and 35:65 and the metallosilicate crystallites have a crystalline microporous structure and are defined as being built up of three-dimensional frameworks of tetrahedral $SiO_4$ units and tetrahedral M units or tetrahedral $SiO_4$ units and octahedral M units which units are corner linked via oxygen atoms and wherein M represents Al, Fe, B, Ga or Ti or combinations of these atoms.

2. The process of claim 1, in which the weight ratio of the metallosilicate crystallites and the binder is between 10:90 and 30:70.

3. The process of claim 1 in which the binder is a low acidity refractory oxide, which is essentially free of aluminum.

4. The process of claim 3, in which the binder is silica.

5. The process of claim 1 in which the metallosilicate crystallites are aluminosilicate zeolite crystallites.

6. The process of claim 5, in which the aluminosilicate zeolite crystallites is selected from the group consisting of an MFI-type zeolite, a ferrierite group zeolite, a TON-type zeolite, an MTW-type zeolite and an MTT-type zeolite.

7. The process of claim 5, in which the aluminosilicate zeolite crystallites have been subjected to a dealumination treatment.

8. The process of claim 7, in which the dealuminated aluminosilicate zeolite crystallites are obtained by contacting the aluminosilicate zeolite crystallites with an aqueous solution of a fluorosilicate salt in which the fluorosilicate salt is represented by the formula: $(A)_{2/b}SIF_6$ in which 'A' is a metallic or non-metallic cation other than H+ having a valence 'b'.

9. The process of claim 7, in which an extrudate of the aluminosilicate zeolite crystallites and the binder is contacted with the aqueous solution of the fluorosilicate salt.

10. The process of claim 1, in which the hydrocarbon feed is a hydrotreated vacuum distillate fraction boiling between 300° and 620° C.

11. The process of claim 1, in which the hydrogenation component is selected from the group consisting of palladium, platinum, nickel and cobalt in a form selected from the group consisting of sulphidic, oxidic and elemental form.

12. The process of claim 1, in which the catalyst composition is obtained by the process comprising:

(a) preparing an extrudable mass comprising a substantially homogenous mixture of metallosilicate crystallites, water, and a source of the low acidity refractory oxide binder present as a mixture of a powder and a sol;

(b) extruding the extrudable mass resulting from step (a);

(c) drying the extrudate resulting from step (b); and, (d) calcining the dried extrudate resulting from step (c).

13. A process for the catalytic dewaxing of a hydrocarbon feed comprising waxy molecules, said process comprising: contacting the hydrocarbon feed under catalytic dewaxing conditions with a catalyst composition comprising metallosilicate crystallites, a binder and a hydrogenation component, in which the weight ratio of the metallosilicate crystallities and the binder is between 5:95 and 35:65, in which the catalyst composition is obtained by the process comprising:

(a) preparing an extrudable mass comprising a substantially homogenous mixture of metallosilicate crystallites, water, a source of the low acidity refractory oxide binder present as a mixture of a powder and a sol, (b) extruding the extrudable mass resulting from step (a), (c) drying the extrudate resulting from step (b) and, (d) calcining the dried extrudate resulting from step (c), in which step (a) is performed by first mixing the metallosilicate crystallites, the powder and an acid sol of the low acidity refractory oxide into a first homogeneous mixture and subsequently adding an amine compound to the first homogeneous mixture such that the pH of the resulting second mixture is raised from below 7 to a value of above 8.

14. The process of claim 13, in which the amine compound is added in step (a) within 20 minutes of performing step (b).

15. The process of claim 13, in which the amine compound is ammonia.

16. A catalyst composition comprising:

a low acidity refractory oxide binder, which binder is essentially free of aluminum; metallosilicate crystallites; and, a hydrogenation component, wherein the weight ratio of the metallosilicate crystallites and the binder is between 5:95 and 35:65 and the metallosilicate crystallites have a crystalline microporous structure and are defined as being built up of three-dimensional frameworks of tetrahedral $SiO_4$ units and tetrahedral M units or tetrahedral $SiO_4$ units and octahedral M units which units are corner linked via oxygen atoms and wherein M represents Al, Fe, B, Ga or Ti or combinations of these atoms.

17. The catalyst composition of claim 16, in which the weight ratio of the metallosilicate crystallites and the binder is between 10:90 and 30:70.

18. The catalyst composition of claim 17, in which the binder is silica.

19. The catalyst of claim 16 wherein the crystallite size is between 0.05 and 0.2 μm and wherein the zeolite crystals have been subjected to a surface dealumination treatment.

20. The catalyst of claim 19, in which the dealuminated zeolite crystallites are obtained by contacting the zeolite crystallites with an aqueous solution of a fluorosilicate salt, in which the fluorosilicate salt is represented by the formula:

$$(A)_{2/b}SIF_6,$$

in which 'A' is a metallic or non-metallic cation other than H+ having the valence 'b'.

21. The catalyst of claim 20, in which an extrudate of the aluminosilicate zeolite crystallites and the binder is contacted with the aqueous solution of the fluorosilicate salt.

22. The process of claim 8, where 'b' is ammonium.

* * * * *